United States Patent
Hebert et al.

(10) Patent No.: US 11,988,540 B2
(45) Date of Patent: May 21, 2024

(54) LIQUID LEVEL DETECTION BASED ON TUNABLE INDUCTIVE-CAPACITIVE TANK CIRCUIT

(71) Applicant: Instrumentation Laboratory Co., Bedford, MA (US)

(72) Inventors: Reed Hebert, Bedford, MA (US); Benjamin Newton, Bedford, MA (US); Len Merrill, Bedford, MA (US)

(73) Assignee: Instrumentation Laboratory Co., Bedford, MA (US)

( * ) Notice: Subject to any disclaimer, the term of this patent is extended or adjusted under 35 U.S.C. 154(b) by 0 days.

(21) Appl. No.: 17/887,658

(22) Filed: Aug. 15, 2022

(65) Prior Publication Data

US 2024/0053184 A1 Feb. 15, 2024

(51) Int. Cl.
G01F 23/26 (2022.01)
G01F 23/263 (2022.01)
G01F 23/80 (2022.01)

(52) U.S. Cl.
CPC .......... *G01F 23/265* (2013.01); *G01F 23/266* (2013.01); *G01F 23/268* (2013.01); *G01F 23/802* (2022.01)

(58) Field of Classification Search
CPC .... G01F 23/265; G01F 23/266; G01F 23/268; G01F 23/802
See application file for complete search history.

(56) References Cited

U.S. PATENT DOCUMENTS

| 4,912,976 A | 4/1990 | Labriola |
| 5,083,470 A | 1/1992 | Davis et al. |
| 5,314,825 A * | 5/1994 | Weyrauch .......... G01N 35/1079 422/63 |

(Continued)

FOREIGN PATENT DOCUMENTS

| CN | 109781209 A | 5/2019 |
| EP | 0101580 | 2/1984 |

(Continued)

OTHER PUBLICATIONS

Extended European Search Report in International Appln. No. 23153684.8, dated Aug. 23, 2023, 11 pages.

(Continued)

*Primary Examiner* — Francis C Gray
(74) *Attorney, Agent, or Firm* — Fish & Richardson P.C.

(57) ABSTRACT

An apparatus includes a probe configured to provide at least a portion of capacitance of an inductance-capacitance (LC) circuit of a detection circuit, the capacitance of the LC circuit being dependent on a distance between the probe and a surface of a liquid in a biochemical analysis system. The apparatus includes a movement mechanism configured to move the probe. The apparatus includes circuitry configured to perform operations that include causing the movement mechanism to move the probe with respect to the liquid; measuring one or more characteristics of an output signal of the detection circuit, the one or more characteristics being dependent on the capacitance of the LC circuit; and detecting, based on the one or more characteristics of the output signal, a contact between the probe and the surface of the liquid.

20 Claims, 9 Drawing Sheets

(56) References Cited

U.S. PATENT DOCUMENTS

| | | | | |
|---|---|---|---|---|
| 5,648,727 | A | * | 7/1997 | Tyberg ............... G01N 35/1009 |
| | | | | 422/106 |
| 6,663,353 | B2 | | 12/2003 | Lipscomb et al. |
| 9,529,009 | B2 | * | 12/2016 | Tanoue ................. G01F 23/266 |
| 2005/0279855 | A1 | * | 12/2005 | Baker ................... G01F 23/266 |
| | | | | 239/71 |
| 2009/0071245 | A1 | | 3/2009 | Harazin et al. |
| 2010/0097231 | A1 | * | 4/2010 | Elsenhans ............ G01F 23/268 |
| | | | | 702/55 |
| 2012/0000296 | A1 | * | 1/2012 | Weng ................. G01N 35/1011 |
| | | | | 73/863.02 |
| 2018/0031591 | A1 | | 2/2018 | Yaita |

FOREIGN PATENT DOCUMENTS

| | | |
|---|---|---|
| JP | H02-500020 | 4/1990 |
| JP | H07-041464 | 7/1995 |
| JP | H09-133686 | 5/1997 |
| JP | 2007114192 | 10/2007 |
| JP | 2015087305 | 7/2015 |
| JP | 2017504806 | 9/2017 |
| WO | WO 2016075989 | 5/2016 |
| WO | WO 2017166215 A1 | 10/2017 |

OTHER PUBLICATIONS

Office Action in Australian Appln. No. 2023202502, dated Feb. 8, 2024, 4 pages.
Office Action in Japanese Appln No. 2023-016567, mailed on Jan. 26, 2024, 15 pages (with English translation).

* cited by examiner

LIQUID LEVEL DETECTION BASED ON TUNABLE INDUCTIVE-CAPACITIVE TANK CIRCUIT

TECHNICAL FIELD

This disclosure relates generally to liquid level detection.

BACKGROUND

Scientific and medical sample analysis machines, such as automatic assay machines and hemostasis analyzers, performing liquid mixing and transfer operations. The accuracy of resulting measurements relies on precise knowledge of liquid volumes, such as volumes of samples, reagents, solvents, or other liquids.

SUMMARY

Some aspects of the present disclosure describe an apparatus. The apparatus includes a probe configured to provide at least a portion of capacitance of an inductance-capacitance (LC) circuit of a detection circuit, the capacitance of the LC circuit being dependent on a distance between the probe and a surface of a liquid in a biochemical analysis system. The apparatus includes a movement mechanism configured to move the probe. The apparatus includes circuitry configured to perform operations that include causing the movement mechanism to move the probe with respect to the liquid; measuring one or more characteristics of an output signal of the detection circuit, the one or more characteristics being dependent on the capacitance of the LC circuit; and detecting, based on the one or more characteristics of the output signal, a contact between the probe and the surface of the liquid.

This and other apparatuses described herein can have any one or more of at least the following characteristics.

In some implementations, the LC circuit includes a tunable LC tank circuit.

In some implementations, the LC tank circuit includes an inductor and a capacitor in addition to the probe in the detection circuit.

In some implementations, the contact between the probe and the surface of the liquid includes contact between a distal end of the probe and the surface of the liquid.

In some implementations, the detection circuit includes a bandpass filter circuit.

In some implementations, the liquid has an ionic conductivity of less than 1 mS/cm.

In some implementations, the liquid includes deionized water.

In some implementations, the operations include determining, based on the one or more characteristics, whether the probe is in contact with a gas bubble.

In some implementations, measuring the one or more characteristics of the output signal includes: providing an input signal to the detection circuit, the input signal being of a particular frequency; and measuring an amplitude of the output signal as at least a portion of the one or more characteristics of the output signal.

In some implementations, the particular frequency is between 1 MHz and 10 MHz.

In some implementations, the particular frequency is within 5% of a resonance frequency of the detection circuit.

In some implementations, measuring the one or more characteristics of the output signal includes identifying a step in the one or more characteristics.

In some implementations, the output signal includes a sinusoidal signal, and measuring the one or more characteristics of the output signal includes: rectifying the output signal, and determining one or more characteristics of the rectified output signal.

In some implementations, the operations include: digitizing the output signal, and measuring the one or more characteristics based on a frequency-domain representation of the digitized output signal.

In some implementations, the operations include processing the frequency-domain representation to filter out interference signals.

In some implementations, processing the frequency-domain representation includes determining a component of the digitized output signal having a frequency matching a frequency of an input signal provided into the detection circuit.

In some implementations, the one or more characteristics include an amplitude of the output signal.

In some implementations, causing the movement mechanism to move the probe with respect to the liquid includes: causing the movement mechanism to move the probe in a first direction parallel to a plane of the surface of the liquid; and causing the movement mechanism to move the probe towards the liquid in a second direction perpendicular to the plane of the surface of the liquid.

Some aspects of this disclosure describe another apparatus. The apparatus can have some or all of at least the characteristics described above. The apparatus includes a probe configured to provide at least a portion of capacitance of a detection circuit including an inductance-capacitance (LC) circuit, the capacitance of the LC circuit being dependent on a distance between the probe and a reference structure. The apparatus includes the reference structure. The apparatus includes a movement mechanism configured to move the probe. The apparatus includes circuitry configured to perform operations that include causing the movement mechanism to move the probe with respect to the reference structure; measuring one or more characteristics of an output signal of the detection circuit, the one or more characteristics being dependent on the capacitance of the LC circuit; and determining, based on the one or more characteristics of the output signal, the distance between the probe and the reference structure.

Some aspects of this disclosure describe another apparatus. The apparatus can have some or all of at least the characteristics described above. The apparatus includes a probe configured to provide at least a portion of a capacitance of a detection circuit, the capacitance of the detection circuit being dependent on a distance between the probe and a surface of a liquid in a biochemical analysis system. The apparatus includes a movement mechanism configured to move the probe. The apparatus includes circuitry configured to perform operations that include causing the movement mechanism to move the probe with respect to the liquid; providing, into the detection circuit, an input signal having a frequency within 5% of a resonance frequency of the detection circuit; measuring one or more characteristics of an output signal of the detection circuit, the one or more characteristics being dependent on the capacitance of the detection circuit; and detecting, based on the one or more characteristics of the output signal, contact between the probe and the surface of the liquid.

The implementations described herein can provide various benefits. For example, in some implementations, the use of a tunable LC circuit in conjunction with a probe in a liquid detection system can allow for tuning the resonance frequency of the system to high frequencies (e.g., 3-30 MHz), which in turn can make the system highly sensitive to detecting a liquid at the tip of the probe. The high sensitivity can facilitate detection of liquids with low ionic content (such as deionized water) that are often used in liquid analysis systems for cleaning, pump flow calibration, etc. The high sensitivity of the disclosed systems can also facilitate fast processing of outputs of the systems, thereby allowing for rapid movement of a probe towards the surface of a liquid. The tunability of the circuit can account for time-variance of the resonance frequency, which can change, for example, as a function of environmental parameters such as temperature, humidity, proximity of other objects etc., and facilitate selection of an optimal frequency at which the high sensitivity of the system can be maintained. Digitizing the output of the disclosed LC circuits can allow for implementing sophisticated signal processing techniques, for example, using bandpass filters to isolate the signal of interest expected at a known frequency. This in turn can facilitate effective interference mitigation, potentially allowing the system to perform reliably even in the presence of multiple sources of interference. In some implementations, the disclosed system can be used to detect whether a probe is approaching a particular object such as a metal calibration post of a liquid analysis system. By providing such a functionality, the disclosed system can facilitate fast calibration of a movement of the probe within a coordinate system demarcated by the calibration post while potentially eliminating chances of the probe coming in contact with the object.

Methods described in this disclosure may be implemented at least as and using systems, devices, and non-transitory, computer-readable storage media. The details of the disclosed implementations are set forth in the accompanying drawings and the description below. Other features, objects, and benefits are apparent from the description, drawings, and claims.

DESCRIPTION OF DRAWINGS

The same reference symbol used in various drawings indicates like elements.

DETAILED DESCRIPTION

Figure 1:
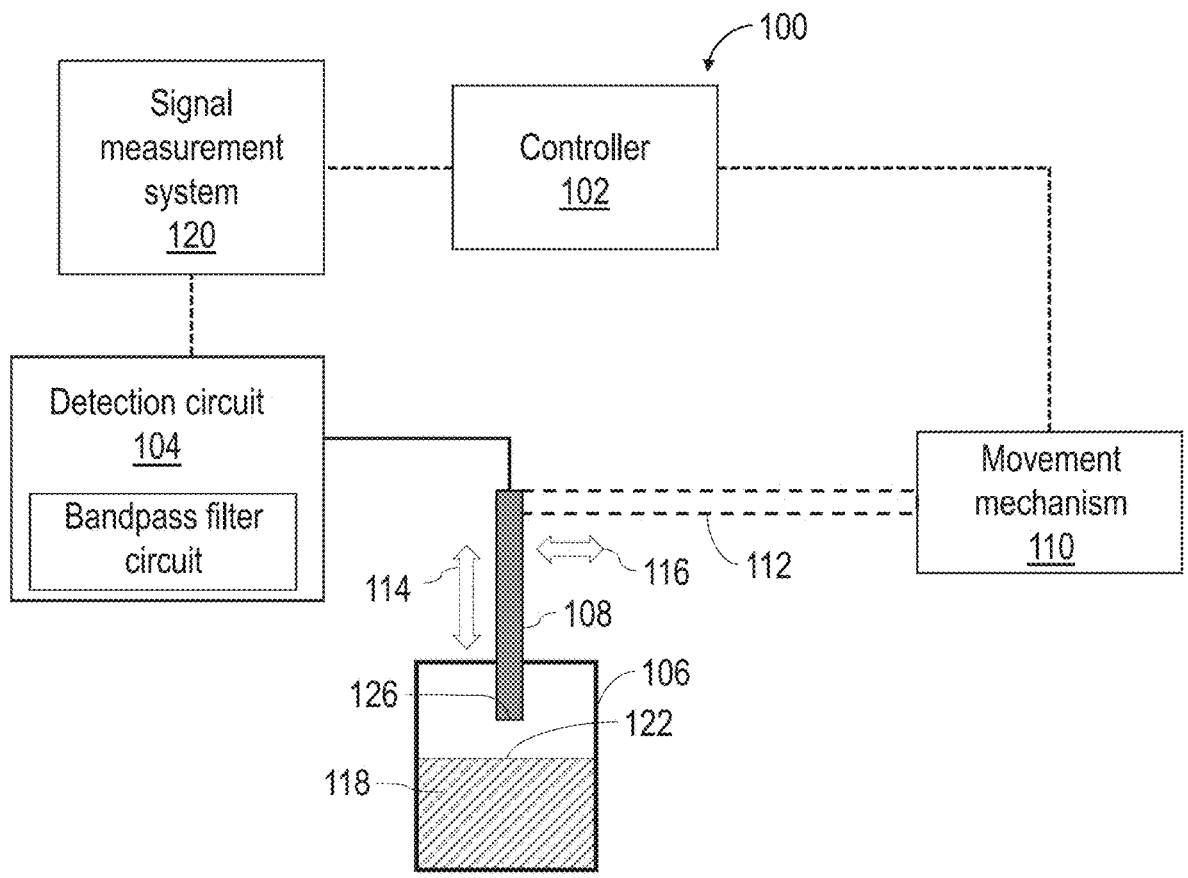
FIG. 1 is a diagram illustrating an example of a sample analysis system, according to some implementations of this disclosure.

This document describes technology in which a tunable inductive-capacitive (LC) circuit is incorporated in a system that detects the surface (or level) of liquid in a container such as a cuvette used in a liquid or biochemical analysis system, e.g., a system that analyzes whole blood or components of whole blood. This allows for tuning the resonance frequency of the circuit to high values (e.g., in the 2-10 MHz range or higher, such as between 3 MHz and 30 MHz) and operating the system at such high frequencies where the system is highly sensitive to detecting the presence of a liquid (or another object) at or near the tip of a probe associated with the system. Such high sensitivity of the disclosed systems allows for detection of liquids with low-ionic content (e.g., deionized water) that are often used in calibration, cleaning etc. of blood or other liquid analysis systems. The tunability of the disclosed systems can account for time-variance of the resonance frequencies that may be a function of various environmental parameters—such as temperature, humidity, proximity of other objects etc.—and thereby allow for selection of operation frequencies that ensure maintaining high sensitivity of the system in spite of the time-variance. In some cases, the tunable LC circuit for liquid surface or level detection can also be adapted to detect solid object surfaces. For example, subtle changes in the output of the disclosed systems can be detected as a probe approaches a particular object (e.g., a metallic object) such that a location of the object can be determined without the probe touching the object. This in turn can allow for fast calibration of systems that rely on precisely identifying locations of particular objects (e.g., metallic calibration posts). For example, in some analysis systems, use of the disclosed technology can make calibrating a coordinate space over which a probe traverses more than 5 times faster as compared to using circuits that rely on oscillating signals with frequencies in a range less than 1 MHz or that rely on counting cycles of a relaxation oscillator.

Sample analysis systems, such as liquid analyzers, blood analysis systems, and other biochemical analysis systems, transfer liquids, e.g., part or whole blood, reagent, cleaning liquid, or other liquids, from and into containers such as cuvettes to prepare samples for analysis and/or perform sample testing. In an example of a sample preparation and analysis operation, a robotically-controlled probe accesses a container (e.g., a cuvette or a vial) to aspirate and/or dispense the liquid from or into the container.

For various operations of such sample analysis systems, it can be useful to know the surface level of liquids in containers. For example, in some sample analysis systems, a test may be conducted when starting up the system to ensure that a liquid dispensing mechanism is functioning as intended and calibrated. For this, a probe may be positioned over a container to dispense a liquid into the container. By detecting the location of the surface of the liquid (e.g., relative to the probe or relative to a bottom of a container), a height of the liquid column (and consequently a volume of the liquid in the container) may be determined and compared with a volume that is expected to be dispensed (e.g., based on a calibrated flow rate through the liquid dispensing mechanism). If the measured volume matches the expected volume, the system is determined to be functioning properly. In some cases, it may be important to determine precisely a position at which the probe breaches the surface of the liquid, for example, to prevent the tip of the probe from entering deep into the liquid. Further, in some cases, because the containers used in sample analysis systems have known geometries, liquid volumes in the containers can be determined based on information on the depth at which a probe detects a liquid within a container (which would also be representative of the height of the liquid column within the container—which may be referred to herein as liquid level).

Various sample analysis systems use low ionic content liquids such as deionized water for the calibration purposes mentioned above. Deionized water can also be used for cleaning samples/reagents from containers such as cuvettes. Liquid detection can be challenging for such low ionic-content liquids because such liquids tend to provide only low-conductivity electrical pathways, resulting in a low parasitic capacitance in the probe. For example, low ionic content liquids can have an ionic conductivity of less than 1 mS/cm. It may be challenging to detect output changes in circuits where the oscillation frequency depends primarily on the parasitic capacitance. For example, the low parasitic capacitance can lead to a low resonance frequency of the circuit (e.g., in the 5-10 KHz range), which may not produce discernible changes in the output (e.g., output voltage) of the circuit as the probe tip approaches the liquid surface and/or comes in contact with the surface of the low ionic content liquid. Technology described in this document attempts to address the foregoing challenges by providing a tunable LC circuit where the resonance frequency can be tuned to substantially high values (e.g., in the 5-10 MHz range) where the sensitivity of the circuit to small changes in parasitic capacitance is high. The disclosed technology also includes operating the system at a frequency near the high resonance frequency to further optimize detection of the small changes in parasitic capacitance. Thus, the technology described herein provides for highly sensitive detection circuits that generate discernible changes in an output (e.g., an output voltage induced by a high-frequency sinusoidal input signal) in response to minute changes in parasitic capacitance resulting from distance changes between the probe tip and a surface or the probe tip contacting a low-ionic liquid such as deionized water.

In addition, by digitizing the high-frequency output signals results in a large number of samples per unit time that allow for fast processing and quick decisions, thereby making the disclosed liquid detection systems highly efficient. This can be leveraged, for example, to move a probe at a first speed until the probe is close to the liquid and subsequently moved at a second, slower speed than the first speed to contact the liquid.

In some implementations, the high sensitivity of the disclosed systems in detecting small changes in capacitance can be leveraged to detect proximity to various objects, particularly conductive objects such as metallic objects. Such conductive objects can induce large changes in parasitic capacitance on a probe even from a distance, thereby causing a change in an output of the system. In some cases, the amount of change in the output can be a function of a distance of the probe from a particular object, and this property in turn may be used in detecting the presence of the object (and/or a distance of the probe from the object) without the probe making contact with the object. For example, in systems where a movement mechanism for a probe has to be calibrated based on certain reference structures (e.g., metallic posts positioned at known locations), the disclosed technology may be used to perform such calibration efficiently. For example, because an output of the disclosed circuits can be indicative of a distance from the reference structures, and the outputs can be processed fast via digital processing, a probe can be moved quickly within a space where such reference structures are present, and the movement can be slowed down only when the probe is within a threshold distance from the reference structures. This in turn can reduce the calibration time as compared to less sensitive circuits where the reference structure may only be detected when in contact with the structures or within a very close distance to the structures. For such low sensitivity circuits, the probe has to be moved slowly and in small steps during a calibration process to avoid high-impact contacts between the probe and the reference structures, and the probe may have to contact the reference structures for calibration to be performed. On the other hand, the high sensitivity attainable by the disclosed technology allows for a probe to be moved continuously and slowed down only when within a threshold proximity to the reference structures. This in turn can allow fast, non-contact calibration of a coordinate system for probe movement, with substantially low risk of damage to the probe.

As shown in FIG. 1, a sample analysis system 100 includes a controller 102, a movement mechanism 110, and a detection circuit 104. In some implementations, the sample analysis system 100 includes a container 106 configured to hold a liquid 118. The movement mechanism 110 is configured to move a probe 108 of the sample analysis system 100 to perform liquid level detection, probe position calibration, and/or other operations using the detection circuit 104. The probe 108 is wholly or partially conducting and can be formed of a material that is resistant to corrosion by liquids to which the probe 108 will be exposed. For example, the probe 108 can be formed of stainless steel. In some implementations, the probe 108 may be integrated together with a pipetting element. For example, the probe 108 may include a channel used for pipetting liquid in or out of the container.

The movement mechanism 110 is mechanically coupled to the probe by one or more suitable attachments 112, such as a movable arm, a tracked mount, or another component. In this example, the movement mechanism 110 and the attachment 112 are configured to move the probe 108 into contact with the liquid 118 in the container 106. In some implementations, the movement mechanism 110 and the attachment 112 instead or additionally are configured to move the probe 108 into contact with or into a proximity of one or more other elements of the sample analysis system 100. In some implementations, the movement mechanism 110 and the attachment 112 are configured to move the probe 108 in three dimensions, e.g., along multiple axes simultaneously and/or along multiple axes one at a time. The movement mechanism 110 can include one or more suitable motors, such as servo motors or stepper motors, to control movement of the attachment 112.

In some implementations, a lateral movement plane 116 is parallel to a surface 122 of the liquid 118, and a vertical movement axis 114 is perpendicular to the lateral movement plane 116. In some implementations, in a process of detecting a liquid (or determining the liquid level) within the container 106, the movement mechanism 110 moves the probe 108 along the lateral movement plane 116 until the probe 108 is positioned directly above the container 106. The movement mechanism 110 then moves the probe 108 towards the liquid 118 along the vertical movement axis 114, e.g., until it is determined that the probe 108 is in contact with the liquid 118. In some implementations, a sample analysis system includes a single container, e.g., as shown for the sample analysis system 100. In some implementations, the sample analysis system includes multiple containers, e.g., arranged in an array with the surface(s) of liquid in one or more containers of the array parallel to the lateral movement plane 116. The probe 108 can be moved in the lateral movement plane 116 to be brought above a selected container of the array, and then can be moved toward the liquid of the selected container along the vertical movement axis 114.

In some implementations, movement along the vertical movement axis 114 includes at least two phases. In a first phase, the movement mechanism 110 moves the probe 108 towards the liquid 118 at a first speed. Once the probe is inserted into the container and moved to within a threshold distance of a predetermined location, the movement mechanism 110 can be configured to slow the descent of the probe 108 to a second speed that is less than the first speed. For example, the threshold distance can be a predetermined distance (e.g., 5 mm) above a last known liquid level in the container. The use of slower movement when the probe 108 is near the liquid 118 can reduce splashing of the liquid 118 when the probe 108 contacts the liquid 118 (thereby potentially preventing or minimizing bubble formation or probe contamination), and/or preventing the probe 108 to be inserted too deep within the liquid (e.g., to minimize the amount of liquid that would need to be subsequently washed off the probe tip). For example, the faster speed can be more than 250 mm/second (e.g., between 300 and 600 mm/second), and the slower speed can be less than 250 mm/second (e.g., between 50 and 200 mm/second).

In some implementations, instead of or in addition to adjustment of probe speed at the threshold distance, liquid level detection can be initiated in response to the probe being moved to within the threshold distance of the predetermined location. For example, in response to the probe being moved to within the threshold distance, an input signal (e.g., input signal 203) can be provided into a detection circuit, a data signal (e.g., data signal 410 or 430) can be provided into a controller or read by the controller, and/or a controller can initiate analysis of the data to identify the liquid level.

The controller 102 includes circuitry including one or more computing devices, such as one or more processors, one or more memory devices, and one or more storage devices. In some implementations, the circuitry also includes one or more rectifiers, analog to digital converters, filters and/or digital signal processors. In some implementations, the controller 102 includes interfacing and/or networking components, e.g., so as to receive inputs from a user and/or to receive data (e.g., instructions) from one or more computing systems communicatively coupled to the controller 102.

In some implementations, as shown in FIG. 1, a signal measurement system 120 is electrically and/or communicatively coupled (e.g., for transmission and/or detection of signals) to the controller 102 and the detection circuit 104. The signal measurement system 120 is configured to process output signals from the detection circuit 104 and provide modified output signals and/or characteristics of the output signals to the controller 102. The controller 102 can determine, based on the modified output signals and/or the characteristics of the output signals, whether the probe 108 is in contact with a surface 122 of the liquid 118. For example, when the probe 108 descends towards the liquid 118, the controller 102 can monitor an output signal (e.g., an output voltage or an output current of a detection circuit) in response to an input signal and determine contact with a liquid surface, for example, when a change in amplitude (or another characteristic) of the output signal satisfies a threshold condition.

The detection circuit 104 can be housed together with the signal measurement system 120 and/or controller 102 in a common enclosure. For example, the detection circuit 104 can include circuit elements in an integrated circuit and/or a printed circuit board (PCB), wherein the integrated circuit and/or PCB are electrically coupled to the signal measurement system 120 and/or controller 102 inside an enclosure of the sample analysis system 100. In some implementations, an integrated circuit and/or PCB can include both the detection circuit 104 and the signal measurement system 120 and/or the controller 102. In some implementations, at least a portion of the detection circuit 104 and/or the signal measurement system 120 can be attached to the probe 108, e.g., so as to move with the probe 108. For example, a PCB can be provided in a liquid-resistant enclosure attached to the probe 108, the PCB hosting the detection circuit 104, and/or the signal measurement system 120.

Figure 2:
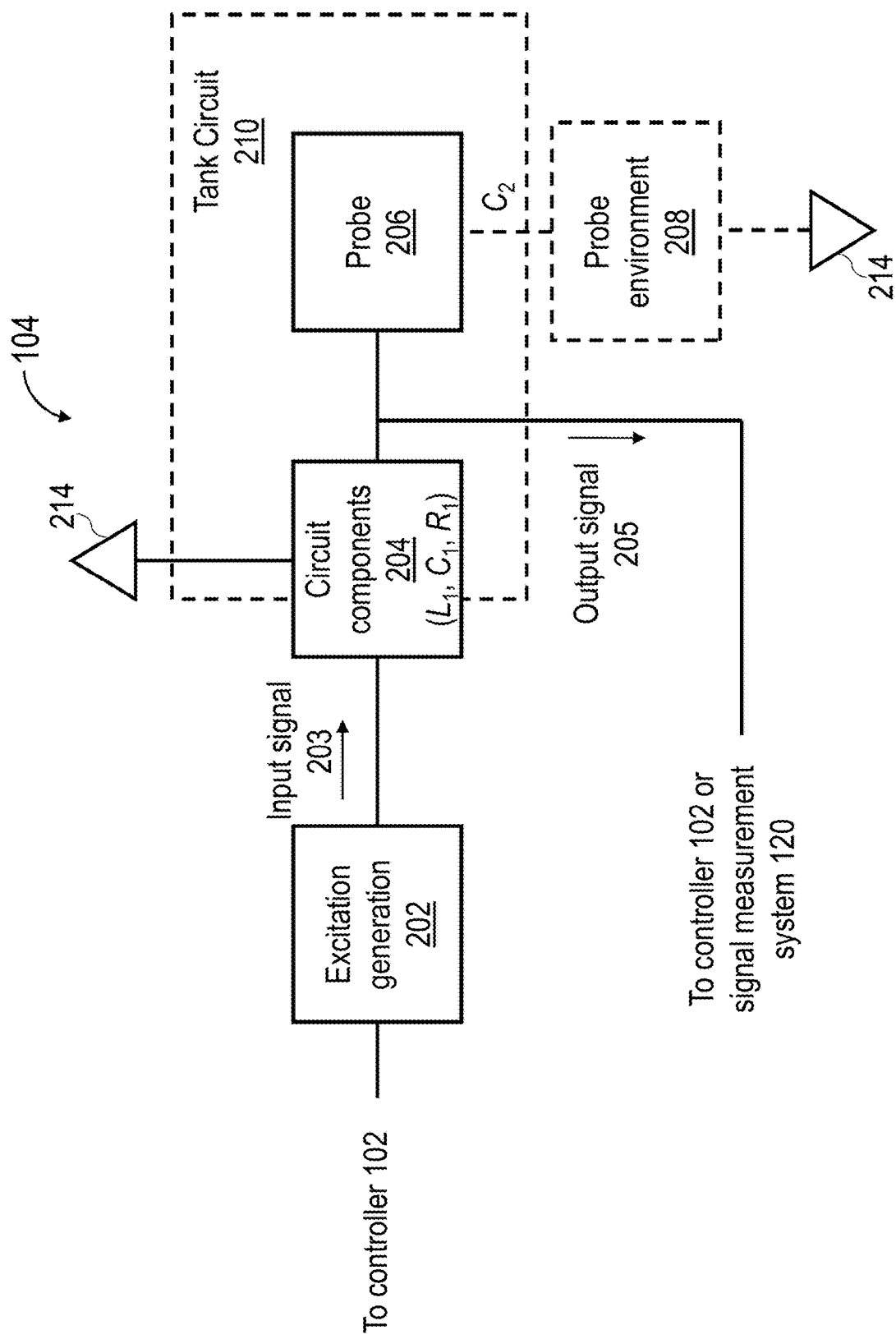
FIG. 2 is a diagram illustrating an example of a detection circuit, according to some implementations of this disclosure.

FIG. 2 is a diagram illustrating an example of a detection circuit, according to some implementations of this disclosure. As shown in FIG. 2, an example of the detection circuit 104 includes an excitation generation module 202 electrically coupled to the controller 102. One or more circuit components 204 (such as one or more resistors, capacitors, inductors, and/or other circuit components such as switches, diodes, transistors, etc.) are electrically coupled to the excitation generation module 202 and to the probe 206 (e.g., probe 108 in FIG. 1). At least some of the circuit components 204 and the probe 206 together form an inductance-capacitance (LC) circuit. In some implementations, at least some of the circuit components 204 and the probe 206 together form a tunable LC tank circuit 210. In this example of a detection circuit 104, the circuit components 204 are associated with an inductance $L_1$, a capacitance $C_1$, and a resistance $R_1$. The controller 102 or signal measurement system 120 is electrically coupled between the circuit components 204 and the probe 206.

A capacitance of the LC tank circuit 210 depends on an environment of the probe 206. For example, the probe 206 can be connected to ground 214 through an environment 208 of the probe 206. The environment 208 of the probe 206 can include one or more objects in proximity to the probe 206. Example objects include a liquid (e.g., a liquid whose liquid level is being determined), a container holding the liquid, a reference structure, and other portions of the sample analysis system 100 that may produce parasitic capacitance affecting the overall capacitance of the LC tank circuit 210. The physical properties of those objects (e.g., their composition and temperature) as well as the distances between the objects and the probe 206, may affect a capacitance $C_2$ associated with this parasitic capacitance, for example, as a function of the effective capacitance between the probe 206 and ground 214.

When the probe environment 208 is sufficiently conductive (e.g., when the probe is in proximity to metallic objects or in contact with a conductive liquid such as saline water), the value of the parasitic capacitance $C_2$ is high enough to cause large changes in output signal 205 even when the input signal 203 remains unchanged. On the other hand, when the probe environment 208 has low conductivity (e.g., when the probe is in proximity to low ionic content liquid such as deionized water), the value of the parasitic capacitance $C_2$ is low. In the absence of technology described herein (e.g., for fixed LC circuits with resonance frequencies below 1 MHz), it is challenging to detect changes to the output signal for such low parasitic capacitances. Moreover, alternative methods that rely on a changing parasitic capacitance affecting the frequency of a relaxation oscillator may be unable to scale to higher frequencies, because higher-frequency operation of the relaxation oscillator relies in turn on a higher-frequency reference clock for measurement. A sufficiently high-frequency reference clock that maintains a high ratio of reference clock frequency to relaxation oscillator frequency may be unavailable, unstable, or otherwise ill-suited for liquid level detection operations.

The tank circuit 210, however, can be tuned such that the resonance frequency of the tank circuit 210 is in a high range (e.g., 3-10 MHz). Exciting the tank circuit 210 at a frequency near such high resonance frequency can cause measurable changes in the output signal 205 even when the parasitic capacitance is small (e.g., in the range of 1 pF or less). Thus, the detection circuit 104 can provide for a highly sensitive system that is capable of detecting small parasitic capacitances that are otherwise challenging to detect. This allows for the detection circuit to detect low ionic content liquids such as deionized water.

The excitation generation module 202 is configured to provide an input signal 203 into the LC tank circuit 210. The input signal 203 can have various forms in different implementations. For example, the input signal 203 can be a periodic signal (e.g., a sine wave signal), the amplitude and frequency of which can vary in different implementations. In some implementations, the input signal 203 has a frequency between 1 MHz and 10 MHz, such as between 2 MHz and 6 MHz or between 3 MHz and 4 MHz. In some implementations, the input signal 203 is a composite signal, such as a square wave signal, a triangle wave signal, a sawtooth signal, a pulsed signal, or another signal, or a combination of these or other signal types.

Figure 5:
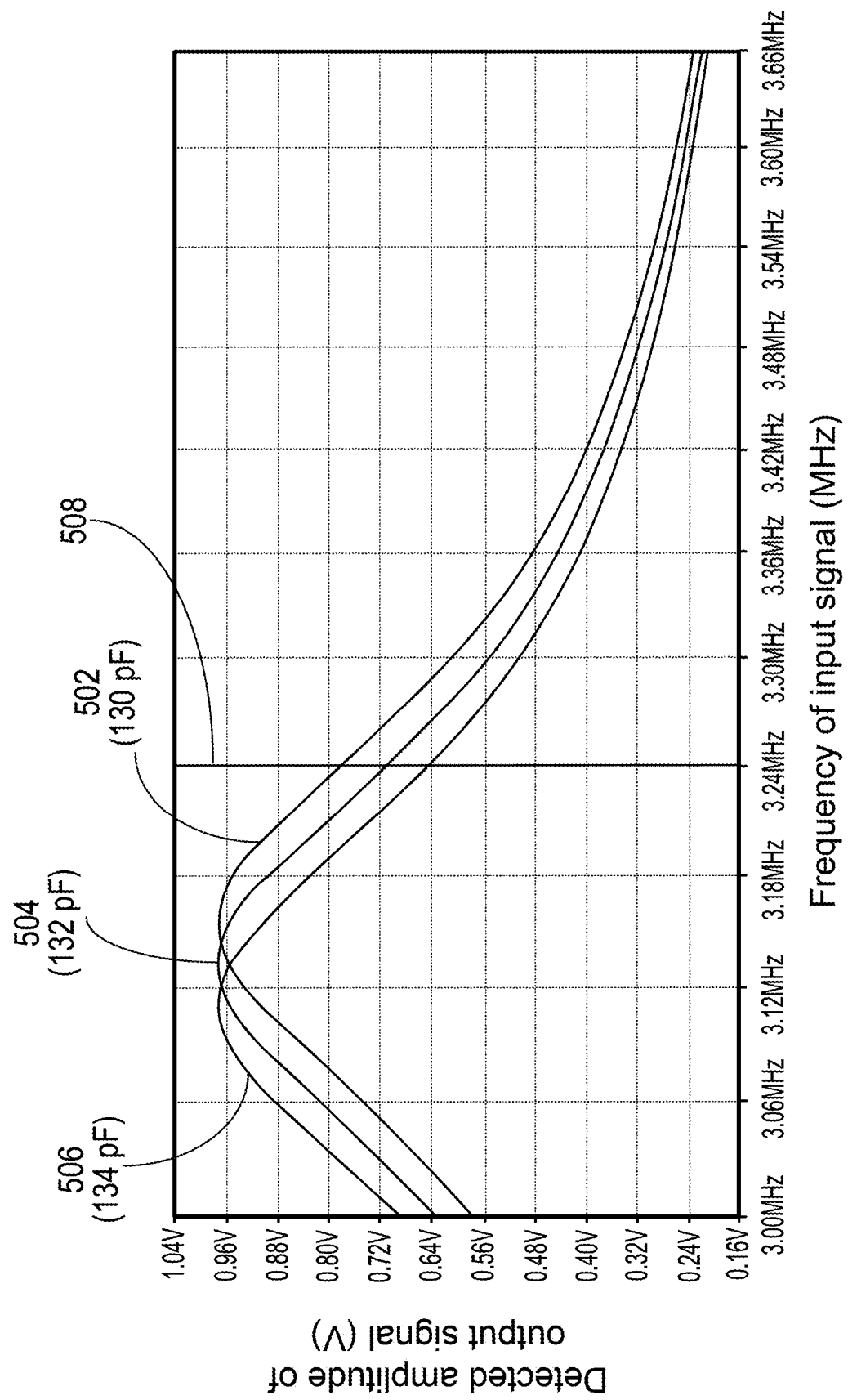
FIG. 5 is a plot illustrating examples of amplitudes of output signals as functions of input signal frequency, according to some implementations of this disclosure.

In some implementations, the frequency of the input signal 203 can be selected based on the resonance frequency of the tank circuit 210. Selection of the input signal frequency is illustrated with reference to FIG. 5 which is a plot illustrating examples variations in amplitudes of simulated output signals as functions of input signal frequency. Specifically, the curves 502, 504, and 506, represent the variations in the amplitude of the output signal as a function of input signal frequency for LC tank circuit capacitances 130 pF, 132 pF, and 134 pF, respectively. In each case, the resonance frequency of the corresponding circuit is indicated by the peaks of the curves 502, 504, and 506. In some implementations, the frequency of the input signal can be selected such that the output voltage change due to the capacitance variation is sufficiently detectable. In the example of FIG. 5, for a 3.24 MHz input signal—as indicated by the vertical line 508—the amplitude of the output voltage for 130 pF is close to 0.8V, which comes down to about 0.64V for 134 pF. As such, for a minute change of 4 pF, the output voltage changes by about 0.16V, which would be easily detectable. In general, by selection of an input signal frequency at which voltages differences between curves corresponding to different capacitances are relatively large, a high sensitivity of the system can be achieved.

In some implementations, the input signal frequency is predetermined, and set into the system. In some implementations, the input frequency can be selected, e.g., optimized before particular runs, for example, to account for time-variance of resonance frequencies, the time-variance being attributable to variance in environmental parameters such as temperature, humidity, proximity of other objects, etc. For example, during a calibration run of the system, the input signal frequency can be swept over a range to determine a frequency at which an output signal amplitude satisfies one or more conditions, e.g., at which the output signal amplitude has a maximum slope as a function of input signal frequency. Using the corresponding frequency for the input signal can ensure large amplitude differences for small changes in circuit capacitances—thereby maintaining the high sensitivity of the system. In some implementations, the detection circuits described in this disclosure can reliably detect capacitance changes of 500 fF, 1 pF, or 2 pF (e.g., can detect changes in output signal characteristics due to the capacitance changes that are larger than noise amplitude in the output signal characteristics), allowing for sensitive detection of liquid even when the liquid is a low ionic-content liquid such as deionized water. In some implementations, the frequency of the input signal is instead or additionally determined based on a type of liquid whose level is to be detected. For example, a user can provide a user input to the controller 102 indicating the type of liquid, or the type of liquid can be automatically determined by the controller 102, e.g., based on stored data indicating a state of each container.

Referring back to FIG. 2, the excitation generation module 202 can include one or more of various combinations of digital and/or analog circuitry. In some implementations, the excitation generation module 202 includes a digital or analog function generator. In some implementations, the excitation generation module 202 includes a crystal oscillator configured to generate periodic signals. In some implementations, the excitation generation module 202 includes a clock signal generator configured to generate periodic signals. In some implementations, the excitation generation module 202 includes digital circuitry (e.g., a processor or FPGA) configured to directly synthesize a periodic signal by digital-to-analog conversion. Various other signal generation methods and devices can be used instead or additionally to obtain desired characteristics of the input signal 203. The excitation generation module 202 can be controlled by the controller 102 (e.g., by signals and/or data provided by the controller 102), such as to switch excitation on/off and/or to change characteristics of the input signal (e.g., frequency, amplitude, and/or signal shape).

In some implementations, the controller 102 is configured to obtain the output signal 205 and determine one or more characteristics thereof. In some implementations, the signal measurement system 120 is configured to perform one or more operations on the output signal 205, and provide a modified output signal 205 or one or more characteristics thereof to the controller 102. In some implementations, the controller 102 can be configured to detect contact with a liquid at the tip of the probe based on one or more characteristics of the output signal.

Figure 3A:
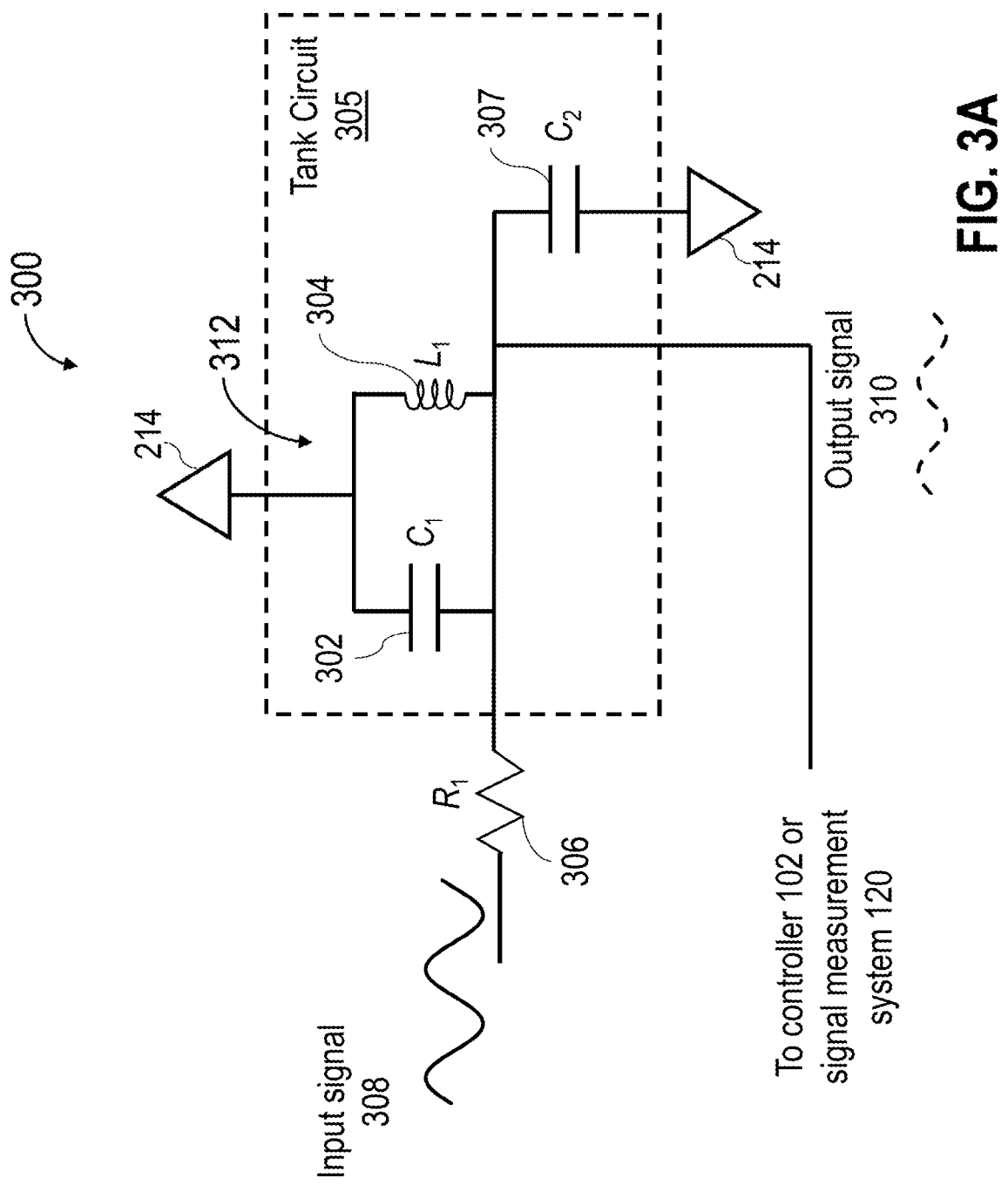
FIG. 3A is a diagram illustrating an example of a detection circuit, according to some implementations of this disclosure.

FIG. 3A shows an example of a detection circuit 300 including the effective capacitance between the probe and the instrument ground. An input signal 308—in this example, a periodic sine wave signal—is provided as an input to the detection circuit 300. In this example, the circuit components 204 include one or more resistors (represented as the resistive element 306 having resistance one or more capacitors (represented as the capacitive element 302 having capacitance $C_1$), and one or more inductors (represented as the inductive element 304 having inductance $L_1$). The detection circuit 300 also includes a parasitic capacitance (represented using the capacitive element 307 with value $C_2$) contributed by the probe based on a composition of the probe's ambient environment. The detection circuit 300 is an inductance-capacitance (LC) circuit. Together, the capacitive element 302, the inductive element 304, and the capacitive element 307, form an LC tank circuit 305. In some implementation, the portion 312 that does not include the capacitive element 307 can be tunable such that the resonance frequency of the tank circuit 305 is in a sufficiently high range that allows for detection of small changes to the capacitive element 307. In accordance with technology described herein, a suitable input signal having a frequency near the high resonance frequency can be provided into the detection circuit 300 to measure changes to the corresponding output signal with high sensitivity.

In the example of FIG. 3A, the LC tank circuit 305 has a resonance frequency of $$f_0 = \frac{1}{2\pi\sqrt{LC}} = \frac{1}{2\pi\sqrt{L_1(C_1 + C_2)}}.$$

Figure 3B:
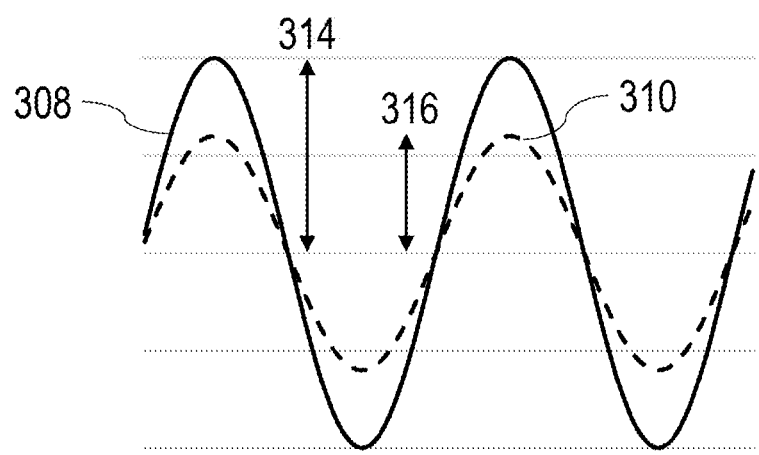
FIG. 3B is a plot illustrating example of input and output signals, according to some implementations of this disclosure.

Accordingly, when the input signal 308 has amplitude $V_{in}$ (shown in FIG. 3B as amplitude 314) and frequency f, and when the output signal 310 has amplitude $V_{out}$ (shown in FIG. 3B as amplitude 316), $V_{out}/V_{in}$ (or, equivalently for constant $V_{in}$, $V_{out}$) has a high value when f≈$f_0$, i.e. when the input frequency is close to the resonance frequency.

$C_2$ is typically small compared to $C_1$ except when the probe is in close proximity to an object that contributes a large parasitic capacitance on the probe. As such, the resonance frequency can be assumed to be $$f_0 = \frac{1}{2\pi\sqrt{L_1 C_1}},$$

where $L_1$ and $C_1$ can be selected to tune the resonance frequency to a high value. The input signal 308 can be provided based on $f_0$, e.g., within 1%, within 2%, within 5%, or within 10% of $f_0$, in various implementations. In some implementations, the frequency of the input signal can be selected as described above with reference to FIG. 5. The inclusion of a tunable LC tank circuit distinct from the capacitance contributed by the probe, such as the LC tank circuit 312, can be useful at least because the tunable LC tank circuit allows the resonance condition of the detection circuit to be preconfigured in advance, so that the input signal 308 can be provided at a frequency close to the resonance frequency.

In some implementations, the inductance L1 is between 1 µH and 100 µH, such as between 5 µH and 40 µH. In some implementations, the capacitance C1 is between 1 pF and 100 pF, such as between 10 pF and 50 pF. In some implementations, the inductance and capacitance are configured so that a corresponding resonance frequency is between 1 MHz and 30 MHz, such as between 1 MHz and 10 MHz, e.g., between 2 MHz and 6 MHz or between 3 MHz and 4 MHz.

The detection circuit 300 is one example of how a detection circuit consistent with this disclosure can be implemented. The scope of this disclosure can include other circuit configurations that can be tuned to provide high resonance frequencies as described above. In some implementations, at least a portion of the signal measurement system 120 is integrated into the controller 102. Operations performed by the controller and/or the signal measurement system 120 operations can be performed by discrete circuitry, by a general purpose computer, or by a combination thereof. For example, digital to analog conversion can be performed by a specialized digital to analog conversion module represented by distinct hardware (e.g., a specialized integrated circuit chip in the signal measurement system 120).

Figure 4A:
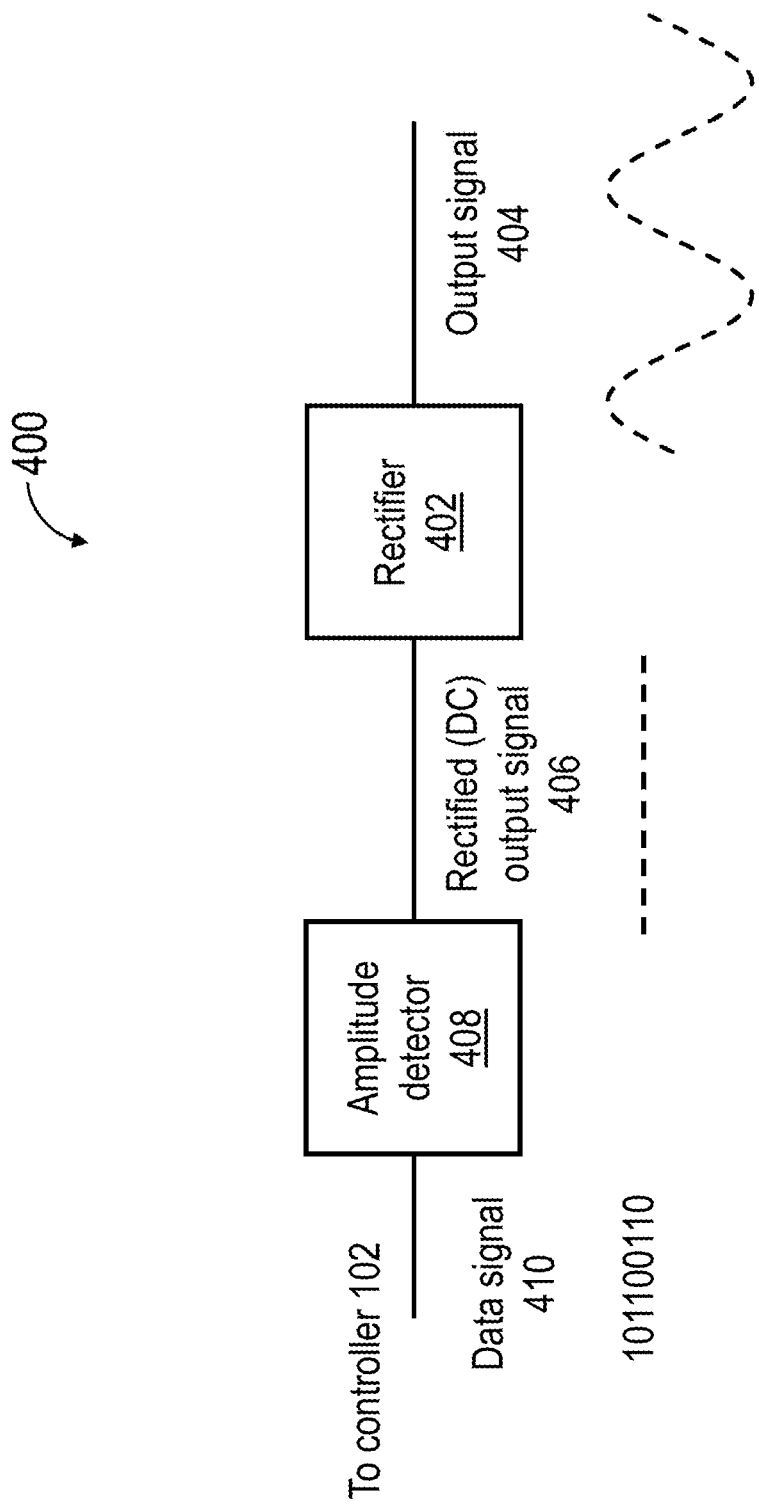
FIGS. 4A-4B are diagrams illustrating examples of signal measurement systems, according to some implementations of this disclosure.

As shown in FIG. 4A, in some implementations, a signal measurement system performs at least some analog processing on the output signal 310. In signal measurement system 400, a rectifier 402 converts the oscillating output signal 404 into a rectified (DC) output signal 406. For example, the rectifier 402 can include a half-wave or full-wave rectifying portion combined with a smoothing circuit or filter, such as an RC shunt filter. In some implementations, the rectified output signal 406 is provided to the controller 102 as an input. In some implementations, an amplitude detector 408 of the signal measurement system 400 measures the magnitude of the rectified output signal 406 and outputs a data signal 410 (e.g., a digital data signal) to the controller 102, where the data signal 410 indicates the magnitude of the rectified output signal 406 and, correspondingly, the amplitude of the output signal 404.

Figure 4B:
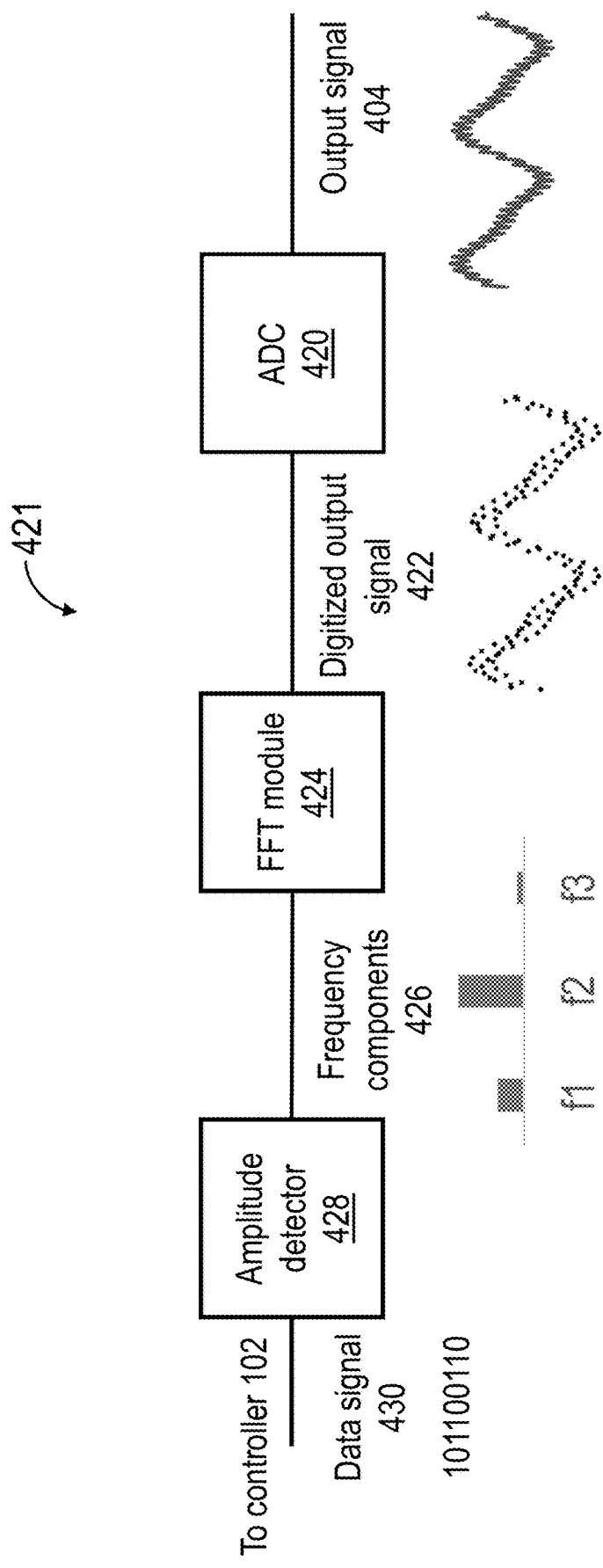

As shown in FIG. 4B, in some implementations, the output signal 404 is digitized for further analysis. In signal measurement system 421, an analog to digital converter (ADC) 420 generates a digitized output signal 422. In some implementations, the digitized output signal 422 is provided into the controller 102. In some implementations, the digitized output signal 422 is further processed by the signal measurement system 421, such as with a spectral analysis. As shown in FIG. 4B, the digitized output signal 422 is decomposed into frequency components 426, such as by a fast Fourier transform (FFT) module 424 of the signal measurement system 421. The decomposition separates a target component corresponding to the actual output signal (e.g., a component having a frequency matching a frequency of a sinusoidal input signal) from components corresponding to other signal contributions, such as internal and external noise and/or interference sources. For example, wireless devices in use in proximity to the sample analysis system 100 can emit signals that are picked up by the detection circuit and detected as part of the output signal 404. An amplitude detector 428 is configured to analyze the frequency components and output, to the controller 102, a data signal 430 indicating a magnitude of the target component and, correspondingly, the amplitude of the output signal 404 with reduced or no contributions from noise and other interference.

Based on the data signal 410 or 430, the controller 102 identifies a probe position at which the probe contacts the liquid. For example, the controller 102 can be configured to identify a rapid change in an amplitude of the output signal 404 (or a component of the output signal 404, e.g., a frequency component) as a function of time or as a function of position of the probe. For example, the controller 102 can be configured to identify a change in the amplitude greater than a threshold value over a predetermined time duration or a predetermined change in position. In some implementations, the controller 102 is configured to implement an algorithm such as cumulative sum control or a derivative-based method for step detection in real-time as the probe is moved, and, upon detection of a step in the amplitude, or detection of a step satisfying one or more conditions (e.g., step height), the controller determines that the probe is in contact with the liquid. In some implementations, the controller 102 can analyze the data signal 410 or 430 at the rate of 10 kHz (10,000 samples of the amplitude per second) to make such a determination. The position of the probe when the controller determines that the probe is in contact with the liquid can correspond to a position of a surface of the liquid, based on which a liquid level of the liquid can be determined.

In some implementations, air bubbles may be present at a liquid surface, and the probe may come in contact with a bubble rather than the liquid surface. In the absence of bubble detection, air may be inadvertently aspirated into the probe instead of liquid, or the liquid level may be inaccurately determined leading to inaccurate analysis results. Determining that the tip of probe is proximate or in contact with a bubble rather than a liquid surface can spawn one or more operations in response, such as generation of an alert message, prevention of aspirating through the probe, or movement of the probe deeper into a container so that the tip of the probe is in contact with the liquid instead of bubbles on the surface of the liquid.

Figure 6:
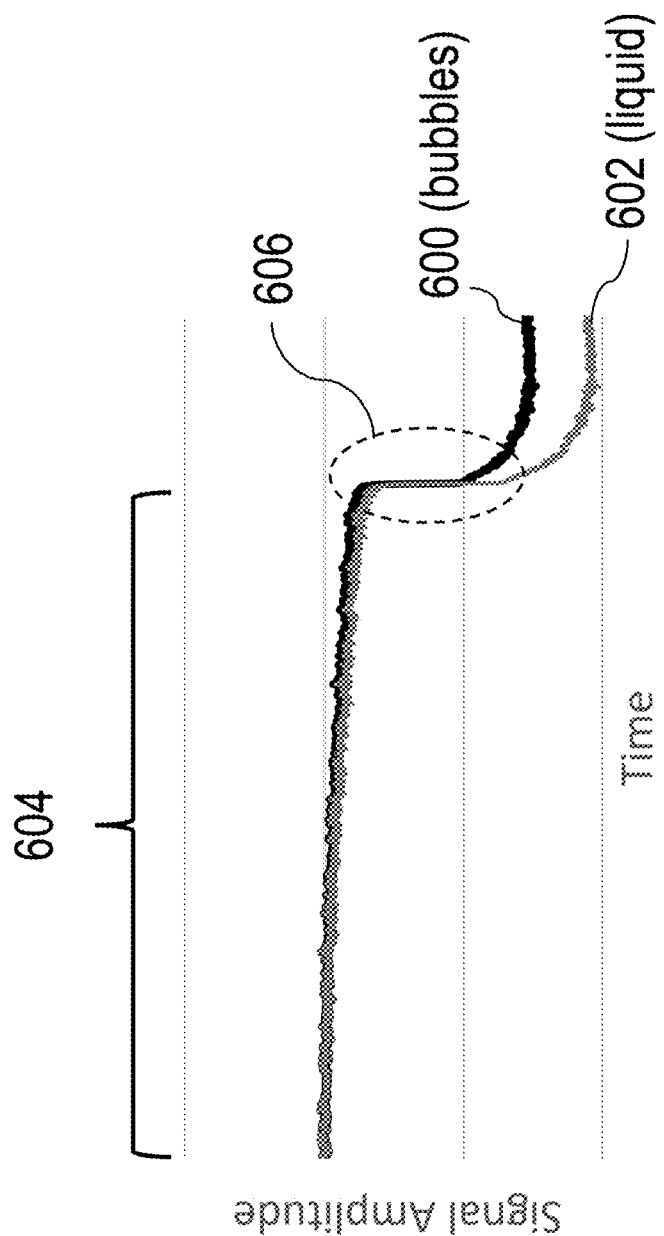
FIG. 6 is a plot illustrating bubble detection based on output signal amplitudes as functions of time, in accordance with the technology described herein.

FIG. 6 is a plot illustrating liquid contact detection and bubble detection based on output signal amplitudes as functions of time. Because the probe is moved at a speed known to the controller 102, data indicating signal amplitude as a function of time corresponds to data indicating signal amplitude as a function of probe position. Specifically, the curve 600 represents a case where a probe that is gradually brought towards a liquid surface contacts gas/air bubbles at the surface of a liquid and stops before contacting the liquid underlying the bubbles. The curve 602 represents a situation where a probe is gradually brought towards a liquid surface that lacks bubbles. During time 604, as the probe is gradually brought towards the liquid surface, the rate of parasitic capacitance build-up is low, and the signal amplitude exhibits only a slight and gradual decrease. For example, during the time before the probe contacts the surface, the signal amplitude may change by less than 1% or by less than 0.5%. The curves 600 and 602 exhibit a sudden, significant decrease in amplitude at the times in region 606, indicating contact with bubble(s) or the liquid surface, respectively. For example, in some implementations, the controller 102 determines that contact has been made based on the amplitude changing by at least 1%, by at least 1.5%, by at least 2%, or by at least another predetermined value over a predetermined time period, or over a predetermined change in probe position. However, in this example, the change in amplitude is greater for liquid contact than for bubble contact. Based on the change in amplitude, in some implementations the controller 102 can determine whether the probe is in contact with a liquid or with bubbles. For example, a change in amplitude less than a threshold value can indicate contact with bubbles, while a change in amplitude more than the threshold bubble/liquid value can indicate contact with liquid. Other or additional methods for distinguishing between bubbles and liquid based on changes in one or more output signal characteristics are also within the scope of this disclosure. For example, a rate of change of the amplitude of the output signal as a function of distance between the tip of the probe and the surface of the liquid can be indicative of whether or not bubbles are present at the surface of the liquid. In some implementations, threshold values (e.g., threshold change in signal amplitude) that differentiate between liquid contact or bubble contact can be based on a type of the liquid.

In some implementations, the high sensitivity of the disclosed systems in detecting small changes in capacitance can be leveraged to detect proximity to various objects/targets, such as highly conductive objects (e.g., metallic objects) or high-ionic content liquids such as saline water. Such conductive objects can induce large parasitic capacitance on a probe even from a distance, thereby causing a change in an output of the system. For example, in some implementations, the controller 102, signal measurement system 120, and/or detection circuit 104 are configured jointly such that a measurable change in the output signal 404 (e.g., a measurable change in an amplitude of the output signal 404) is detected when the probe is within a proximity of a conducting object that is between 1 mm and 20 mm, such as between 1 mm and 10 mm, between 2 mm and 5 mm, or between 5 mm and 10 mm. The measurable change can be, for example, a change that is detectable by being larger than noise in the output signal 404. In some cases, the amount of change in the output can be a function of a distance of the probe from a particular object, and this property in turn may be used in detecting the presence of the object (and/or a distance of the probe from the object) without the probe making contact with the object.

Figure 7A:
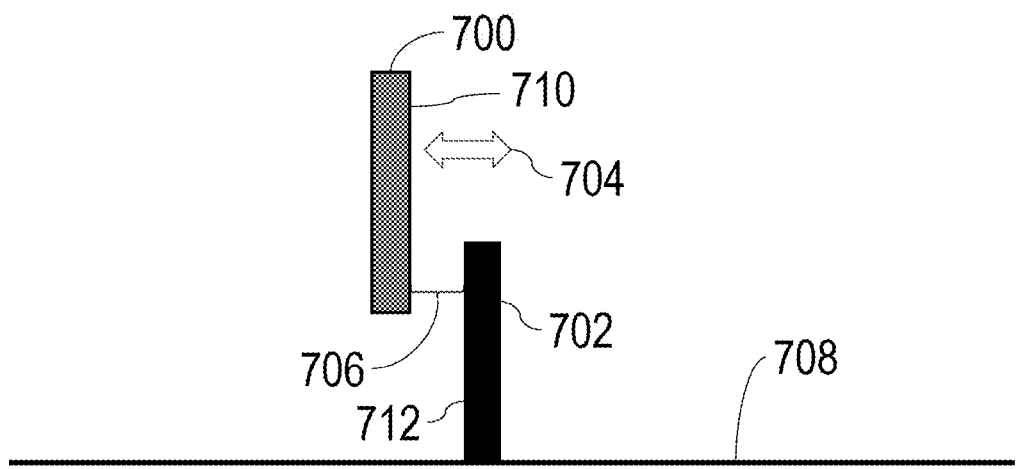
FIGS. 7A-7B are diagrams illustrating calibration of a space over which a probe traverses, in accordance with some implementations of this disclosure.
Figure 7B:
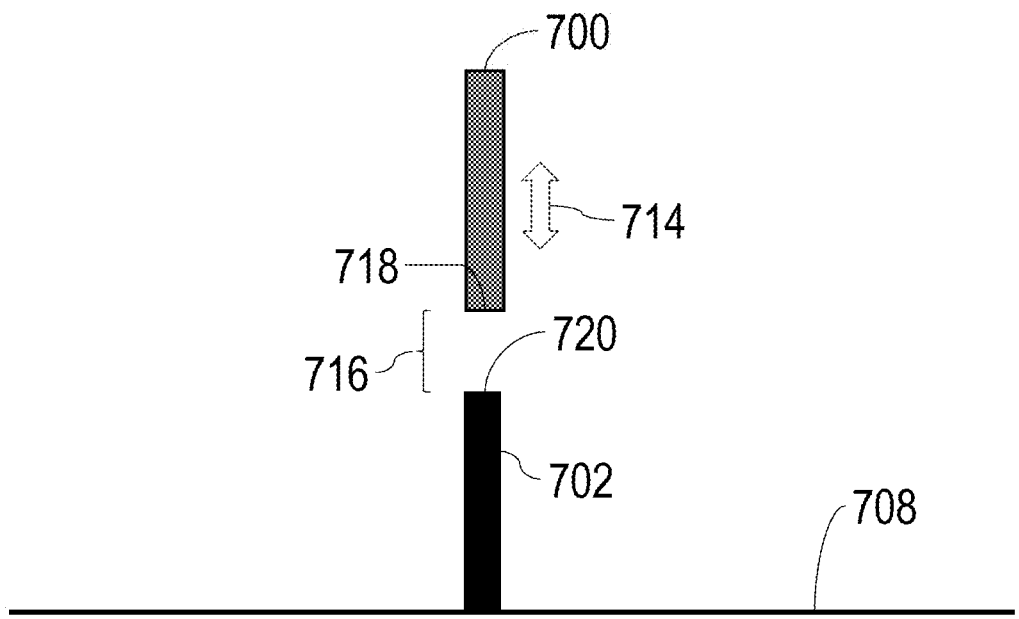

FIGS. 7A-7B are diagrams illustrating calibration of a space over which a probe traverses, in accordance with some implementations of this disclosure. As shown in FIGS. 7A-7B, in some implementations a sample analysis system includes a reference structure 702, such as a metallic calibration post that serves as a reference location for defining/calibrating a spatial coordinate system over which the probe traverses. In some implementations, the reference structure 702 extends perpendicular to a plane 708 that is parallel to surface(s) of liquid in one or more containers. The plane 708 can be substantially same as the lateral movement plane 116 described with reference to FIG. 1. For example, the reference structure 702 can be a post attached to a base, support, or other portion of the sample analysis system. In some implementations, the reference structure 702 is at least partially conducting, e.g., formed of a metal such as stainless steel, which imparts a large amount of parasitic capacitance on the probe when the probe is sufficiently close to the reference structure. For example, in some implementations, the capacitance between a probe 700 and the reference structure 702 is between 50 and 250 pF when the probe 700 is between 1 mm and 5 mm from the reference structure 702.

In some implementations, as shown in FIG. 7A, the probe 700 can be moved along a first direction 704, e.g., laterally and parallel to the plane 708, to approach the reference structure 702. As the probe 700 moves, the one or more characteristics of the output signal of a detection circuit are monitored to determine a distance between the probe 700 and the reference structure 702, e.g., a distance 706 between a lateral surface 710 of the probe 700 and a lateral surface 712 of the reference structure 702. The detection circuit can be the same detection circuit used for liquid level detection, e.g., detection circuit 104 or 300, and an output signal of the detection circuit can be provided to controller 102 or signal measurement system 120 for analysis.

The distance 706 can be determined based on a predetermined functional relationship that relates the one or more characteristics (and/or changes therein) to the distance. For example, the controller 102 stores or has access to a function A(r), where A is the amplitude of the output signal and r is the distance 806. Based on the functional relationship and the one or more characteristics, r can be determined. In some implementations, the distance 706 is determined by monitoring the one or more characteristics and identifying a step in the one or more characteristics as the probe 700 moves; the presence of a step can be indicative of the probe 700 being in close proximity to the reference structure 702 (e.g., within 2 mm of the reference structure 702). In some implementations, the distance 706 or the close proximity is determined based on a comparison of the one or more characteristics to an initial value of the one or more characteristics. For example, an amplitude of the output signal can decrease steadily as the probe 700 approaches the reference structure 702, in comparison to an initial value of the amplitude when the probe 700 is relatively far from the reference structure 702 (e.g., at least 10 mm away, at least 20 mm away, or at least 50 mm away, in various implementations). When the amplitude decreases to a threshold proportion of its initial value, such as a threshold proportion between 0.95 and 0.99 of its initial value, the controller 102 can determine that the probe is within close proximity to the reference structure 702. Alternatively, or in addition, the distance 706 can be determined as a function of the amplitude.

In some implementations, when the probe 700 is determined to be within a threshold distance from or within close proximity to the reference structure 702, a movement of the probe 700 can be stopped or reversed (e.g., without contacting the reference structure 702). Because the reference structure 702 is located at a reference position within a coordinate system (e.g., an x-y-z coordinate system in which plane 708 is the xy plane), a location of the probe 700 can be determined in the coordinate system. For example, if the first direction 704 is along the x axis, the x coordinate of the probe 700 can be determined. A similar process can be used to determine a second coordinate (e.g., they coordinate), e.g., by moving the probe 700 in a direction parallel to the plane 708 and perpendicular to the first direction 704.

As shown in FIG. 7B, the probe 700 can be moved vertically and perpendicular to the plane 708, e.g., to approach the reference structure in direction 714 (e.g., the z direction). As the probe 700 moves, a distance 716 between a distal end 718 of the probe 700 and a portion (e.g., a distal end 720) of the reference structure 702 is determined, e.g., to determine, based on the presence of a change in the one or more characteristics of the output signal, a location of the probe 700 at which the distance 716 is less than a predetermined threshold or at which the probe 700 is in close proximity to the reference structure. Based on stored data indicating a coordinate of the distal end 720 of the reference structure 702, a coordinate of the probe 700 in the direction 714 (E.g., a z-coordinate) can be determined, e.g., without contacting the reference structure 702.

Less sensitive systems can avoid or reduce reference structure contact by moving the probe slowly, but this increases the time consumed by the calibration process. The high sensitivity provided by methods and apparatuses according to this disclosure can allow for fast probe movement during calibration, decreasing the "time of first test" by which an assay can be performed after a sample analysis system is started up. Position calibration as described in reference to FIGS. 7A-7B can be performed in response to various triggers, such as upon sample analysis system startup, upon an instruction from a user or from a computing system, or periodically when the sample analysis system is powered on.

Because reference structures can be solid and unyielding, contact with reference structures—especially combined with continued probe movement into reference structures—can cause damage to probes. Systems with lower sensitivity than the systems described herein may perform calibration using a repeated approach-contact-withdraw process. In this process, the probe approaches a reference structure from above, makes contact with the reference structure, withdraws from the reference structure, translates laterally, and again approaches the reference structure, this process being repeated until no contact is made. Some implementations of the methods and apparatuses disclosed herein, because of their sensitivity and/or high detection speed, can perform probe position calibration without requiring the probe to contact the target, e.g., as described for probe position calibration in reference to FIGS. 7A-7B. This can reduce incidence of probe damage due to the probe contacting structures such as the reference structure 702. In addition, the high sensitivities of some implementations of this disclosure mean that lateral calibration (e.g., as shown in FIG. 7A) can be performed in addition to vertical calibration. Lower-sensitivity systems, by contrast, may be capable reliably only of vertical calibration as shown in FIG. 7B.

Some features described may be implemented in digital and/or analog electronic circuitry or in computer hardware, firmware, software, or in combinations of them. Some features may be implemented in a computer program product tangibly embodied in an information carrier, e.g., in a machine-readable storage device, for execution by a programmable processor. Method steps may be performed by a programmable processor executing a program of instructions to perform functions of the described implementations by operating on input data and generating output, by discrete circuitry performing analog and/or digital circuit operations, or by a combination thereof.

Some described features may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random-access memory or both. The essential elements of a computer are a processor for executing instructions and one or more memories for storing instructions and data. Generally, a computer may communicate with mass storage devices for storing data files. These mass storage devices may include magnetic disks, such as internal hard disks and removable disks; magneto-optical disks; and optical disks. Storage devices suitable for tangibly embodying computer program instructions and data include all forms of non-volatile memory, including by way of example, semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits). To provide for interaction with a user the features may be implemented on a computer having a display device such as a CRT (cathode ray tube), LED (light emitting diode) or LCD (liquid crystal display) display or monitor for displaying information to the author, a keyboard and a pointing device, such as a mouse or a trackball by which the author may provide input to the computer.

A number of implementations have been described. Nevertheless, it will be understood that various modifications may be made. Elements of one or more implementations may be combined, deleted, modified, or supplemented to form further implementations. In yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. An apparatus comprising:
a probe configured to provide at least a portion of capacitance of an inductance-capacitance (LC) circuit of a detection circuit, the capacitance of the LC circuit being dependent on a distance between the probe and a surface of a liquid in a biochemical analysis system wherein the liquid has an ionic conductivity of less than 1 mS/cm;
a movement mechanism configured to move the probe; and
circuitry configured to perform operations comprising:
causing the movement mechanism to move the probe with respect to the liquid;
measuring one or more characteristics of an output signal of the detection circuit, the one or more characteristics being dependent on the capacitance of the LC circuit; and
detecting, based on the one or more characteristics of the output signal, a contact between the probe and the surface of the liquid.

2. The apparatus of claim 1, wherein the LC circuit comprises a tunable LC tank circuit.

3. The apparatus of claim 2, wherein the LC tank circuit comprises an inductor and a capacitor in addition to the probe in the detection circuit.

4. The apparatus of claim 1, wherein the contact between the probe and the surface of the liquid comprises contact between a distal end of the probe and the surface of the liquid.

5. The apparatus of claim 1, wherein the detection circuit comprises a bandpass filter circuit.

6. The apparatus of claim 1, wherein the liquid comprises deionized water.

7. The apparatus of claim 1, wherein the operations comprise determining, based on the one or more characteristics, whether the probe is in contact with a gas bubble.

8. The apparatus of claim 1, wherein measuring the one or more characteristics of the output signal comprises:
providing an input signal to the detection circuit; and
measuring an amplitude of the output signal as at least a portion of the one or more characteristics of the output signal.

9. The apparatus of claim 8, wherein a frequency of the input signal is between 1 MHz and 10 MHz.

10. The apparatus of claim 8, wherein a frequency of the input signal is within 5% of a resonance frequency of the detection circuit.

11. The apparatus of claim 1, wherein measuring the one or more characteristics of the output signal comprises identifying a step in the one or more characteristics.

12. The apparatus of claim 1, wherein the output signal comprises a sinusoidal signal, and
wherein measuring the one or more characteristics of the output signal comprises:
rectifying the output signal, and
determining one or more characteristics of the rectified output signal.

13. The apparatus of claim 1, wherein the operations comprise:
digitizing the output signal, and
measuring the one or more characteristics based on a frequency-domain representation of the digitized output signal.

14. The apparatus of claim 13, wherein the operations comprise:
processing the frequency-domain representation to filter out interference signals.

15. The apparatus of claim 14, wherein processing the frequency-domain representation comprises determining a component of the digitized output signal having a frequency matching a frequency of an input signal provided into the detection circuit.

16. The apparatus of claim 1, wherein the one or more characteristics comprise an amplitude of the output signal.

17. The apparatus of claim 1, wherein causing the movement mechanism to move the probe with respect to the liquid comprises:
causing the movement mechanism to move the probe in a first direction parallel to a plane of the surface of the liquid; and
causing the movement mechanism to move the probe towards the liquid in a second direction perpendicular to the plane of the surface of the liquid.

18. An apparatus comprising:
a probe configured to provide at least a portion of capacitance of a detection circuit comprising an inductance-capacitance (LC) circuit, the capacitance of the LC circuit being dependent on a distance between the probe and a reference structure;
the reference structure;
a movement mechanism configured to move the probe; and
circuitry configured to perform operations comprising:
causing the movement mechanism to move the probe with respect to the reference structure;
measuring one or more characteristics of an output signal of the detection circuit, the one or more characteristics being dependent on the capacitance of the LC circuit; and
determining, based on the one or more characteristics of the output signal, the distance between the probe and the reference structure, wherein measuring the one or more characteristics of the output signal comprises:
providing an input signal to the detection circuit, a frequency of the input signal being between 1 MHz and 10 MHz; and
measuring an amplitude of the output signal as at least a portion of the one or more characteristics of the output signal.

19. An apparatus comprising:
a probe configured to provide at least a portion of a capacitance of a detection circuit, the capacitance of the detection circuit being dependent on a distance between the probe and a surface of a liquid in a biochemical analysis system;
a movement mechanism configured to move the probe; and
circuitry configured to perform operations comprising:
causing the movement mechanism to move the probe with respect to the liquid;

providing, into the detection circuit, an input signal having a frequency within 5% of a resonance frequency of the detection circuit;

measuring one or more characteristics of an output signal of the detection circuit, the one or more characteristics being dependent on the capacitance of the detection circuit; and detecting, based on the one or more characteristics of the output signal, contact between the probe and the surface of the liquid.

20. The apparatus of claim 18, wherein the liquid has an ionic conductivity of less than 1 mS/cm.

* * * * *